US009799338B2

United States Patent
Grover

(10) Patent No.: US 9,799,338 B2
(45) Date of Patent: Oct. 24, 2017

(54) VOICE PRINT IDENTIFICATION PORTAL

(71) Applicant: Voicelt Technologies, LLC, Minneapolis, MN (US)

(72) Inventor: Noel Grover, Minneapolis, MN (US)

(73) Assignee: Voicelt Technology, Minneapolis, MN (US)

( * ) Notice: Subject to any disclaimer, the term of this patent is extended or adjusted under 35 U.S.C. 154(b) by 0 days.

(21) Appl. No.: 14/263,572

(22) Filed: Apr. 28, 2014

(65) Prior Publication Data

US 2014/0350932 A1  Nov. 27, 2014

Related U.S. Application Data

(62) Division of application No. 12/075,799, filed on Mar. 13, 2008, now abandoned.

(Continued)

(51) Int. Cl.
| | | |
|---|---|---|
| *G10L 17/08* | (2013.01) | |
| *G10L 17/06* | (2013.01) | |
| *G06F 21/32* | (2013.01) | |
| *H04L 29/06* | (2006.01) | |
| *G10L 15/26* | (2006.01) | |
| *G10L 17/00* | (2013.01) | |

(52) U.S. Cl.
CPC .............. *G10L 17/06* (2013.01); *G06F 21/32* (2013.01); *G10L 15/26* (2013.01); *G10L 17/00* (2013.01); *H04L 63/0861* (2013.01)

(58) Field of Classification Search
None
See application file for complete search history.

(56) References Cited

U.S. PATENT DOCUMENTS 4,087,630 A * 5/1978 Browning ............... G10L 15/00
  704/236
4,181,821 A * 1/1980 Pirz .......................... G10L 25/87
  704/245

(Continued)

OTHER PUBLICATIONS

Application and File history for U.S. Appl. No. 12/075,799, filed Mar. 13, 2008. Inventor: Grover.

*Primary Examiner* — Pierre-Louis Desir
*Assistant Examiner* — Jonathan Kim
(74) *Attorney, Agent, or Firm* — Patterson Thuente Pedersen, P.A.

(57) ABSTRACT

Systems and methods providing for secure voice print authentication over a network are disclosed herein. During an enrollment stage, a client's voice is recorded and characteristics of the recording are used to create and store a voice print. When an enrolled client seeks access to secure information over a network, a sample voice recording is created. The sample voice recording is compared to at least one voice print. If a match is found, the client is authenticated and granted access to secure information.

Systems and methods providing for a dual use voice analysis system are disclosed herein. Speech recognition is achieved by comparing characteristics of words spoken by a speaker to one or more templates of human language words. Speaker identification is achieved by comparing characteristics of a speaker's speech to one or more templates, or voice prints. The system is adapted to increase or decrease matching constraints depending on whether speaker identification or speaker recognition is desired.

5 Claims, 13 Drawing Sheets

Related U.S. Application Data

(60) Provisional application No. 60/894,627, filed on Mar. 13, 2007.

(56) References Cited

U.S. PATENT DOCUMENTS

| | | | | |
|---|---|---|---|---|
| 4,348,550 | A * | 9/1982 | Pirz | H04M 1/271 379/355.06 |
| 4,363,102 | A * | 12/1982 | Holmgren | C03B 23/0254 704/238 |
| 4,415,767 | A * | 11/1983 | Gill | G10L 15/02 704/243 |
| 4,831,551 | A * | 5/1989 | Schalk | G10L 15/12 704/233 |
| 5,033,089 | A * | 7/1991 | Fujimoto | G10L 15/063 704/247 |
| 5,583,961 | A * | 12/1996 | Pawlewski | G10L 25/87 704/205 |
| 5,615,277 | A | 3/1997 | Hoffman | |
| 5,895,447 | A * | 4/1999 | Ittycheriah | G10L 15/07 704/231 |
| RE36,478 | E | 12/1999 | McAulay et al. | |
| 6,088,669 | A * | 7/2000 | Maes | G10L 17/00 704/231 |
| 6,092,192 | A | 7/2000 | Kanevsky et al. | |
| 6,107,935 | A | 8/2000 | Comerford et al. | |
| 6,226,605 | B1 | 5/2001 | Nejime et al. | |
| 6,256,737 | B1 | 7/2001 | Bianco et al. | |
| 6,356,868 | B1 | 3/2002 | Yuschik et al. | |
| 6,493,669 | B1 | 12/2002 | Curry et al. | |
| 6,766,295 | B1 * | 7/2004 | Murveit | G10L 15/30 379/88.01 |
| 6,799,163 | B2 | 9/2004 | Nolan | |
| 6,859,777 | B2 | 2/2005 | Krasle | |
| 6,891,932 | B2 | 5/2005 | Bhargava et al. | |
| 6,917,917 | B1 | 7/2005 | Kim | |
| 6,931,374 | B2 | 8/2005 | Attias et al. | |
| 6,961,700 | B2 | 11/2005 | Mitchell et al. | |
| 7,020,609 | B2 | 3/2006 | Thrift et al. | |
| 7,035,799 | B1 | 4/2006 | Hauenstein | |
| 7,158,871 | B1 * | 1/2007 | Ilan | G01C 21/3608 701/36 |
| 7,403,766 | B2 | 7/2008 | Hodge | |
| 7,454,624 | B2 | 11/2008 | LaCous | |
| 7,689,416 | B1 * | 3/2010 | Poirier | G10L 15/07 704/231 |
| 8,116,463 | B2 * | 2/2012 | Wang | G10L 25/81 381/110 |
| 8,682,667 | B2 * | 3/2014 | Haughay | G10L 15/22 704/246 |
| 9,111,407 | B2 * | 8/2015 | Broman | G06Q 20/341 |
| 9,646,610 | B2 * | 5/2017 | Macho | G10L 15/22 |
| 2002/0116192 | A1 * | 8/2002 | Shozakai | G10L 15/144 704/251 |
| 2002/0169604 | A1 * | 11/2002 | Damiba | G10L 15/183 704/231 |
| 2003/0078784 | A1 * | 4/2003 | Jordan | G10L 15/22 704/275 |
| 2003/0095525 | A1 | 5/2003 | Lavin et al. | |
| 2003/0144846 | A1 * | 7/2003 | Denenberg | G10L 21/00 704/277 |
| 2003/0217276 | A1 | 11/2003 | LaCous | |
| 2004/0059953 | A1 | 3/2004 | Purnell | |
| 2004/0107108 | A1 * | 6/2004 | Rohwer | G10L 15/30 704/275 |
| 2004/0121812 | A1 | 6/2004 | Doran et al. | |
| 2004/0193420 | A1 * | 9/2004 | Kennewick | G06F 17/30654 704/257 |
| 2004/0232221 | A1 | 11/2004 | Beenau et al. | |
| 2005/0033573 | A1 * | 2/2005 | Hong | G10L 15/063 704/250 |
| 2005/0065791 | A1 | 3/2005 | Kim | |
| 2005/0154596 | A1 * | 7/2005 | Mochary | G10L 15/26 704/277 |
| 2005/0182627 | A1 * | 8/2005 | Tanaka | G11B 20/00007 704/248 |
| 2005/0218215 | A1 | 10/2005 | Lauden | |
| 2005/0238214 | A1 | 10/2005 | Matsuda et al. | |
| 2005/0275505 | A1 * | 12/2005 | Himmelstein | G10L 17/22 340/5.8 |
| 2005/0275558 | A1 * | 12/2005 | Papadimitriou | G10L 15/22 340/692 |
| 2006/0020460 | A1 * | 1/2006 | Itou | G10L 17/24 704/246 |
| 2006/0041755 | A1 | 2/2006 | Pemmaraju | |
| 2006/0056662 | A1 | 3/2006 | Thieme | |
| 2006/0277043 | A1 | 12/2006 | Tomes et al. | |
| 2007/0165792 | A1 * | 7/2007 | Song | G10L 15/26 379/80 |
| 2007/0165911 | A1 | 7/2007 | Baentsch et al. | |
| 2008/0101658 | A1 | 5/2008 | Ahern et al. | |
| 2008/0195380 | A1 * | 8/2008 | Ogasawara | G10L 15/065 704/10 |
| 2008/0256613 | A1 * | 10/2008 | Grover | G06F 21/32 726/5 |
| 2011/0221671 | A1 * | 9/2011 | King, III | G02B 27/017 345/156 |
| 2012/0150541 | A1 * | 6/2012 | Talwar | G10L 15/065 704/249 |
| 2013/0060487 | A1 * | 3/2013 | Papadimitriou | G10L 15/22 702/34 |
| 2013/0132091 | A1 * | 5/2013 | Skerpac | G10L 17/005 704/273 |
| 2013/0225128 | A1 * | 8/2013 | Gomar | H04W 12/06 455/411 |
| 2013/0227678 | A1 * | 8/2013 | Kang | G06F 21/32 726/19 |
| 2014/0122087 | A1 * | 5/2014 | Macho | G10L 17/22 704/275 |
| 2015/0019220 | A1 * | 1/2015 | Talhami | G10L 15/063 704/244 |

* cited by examiner

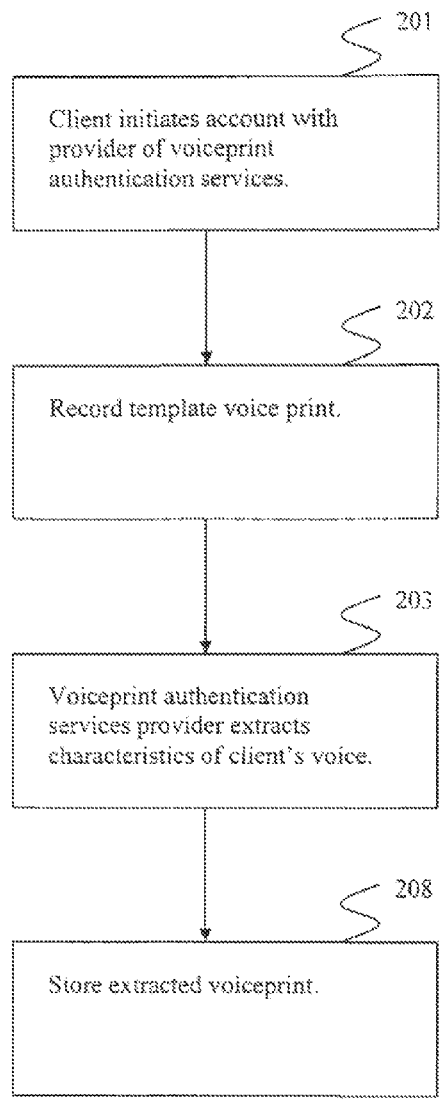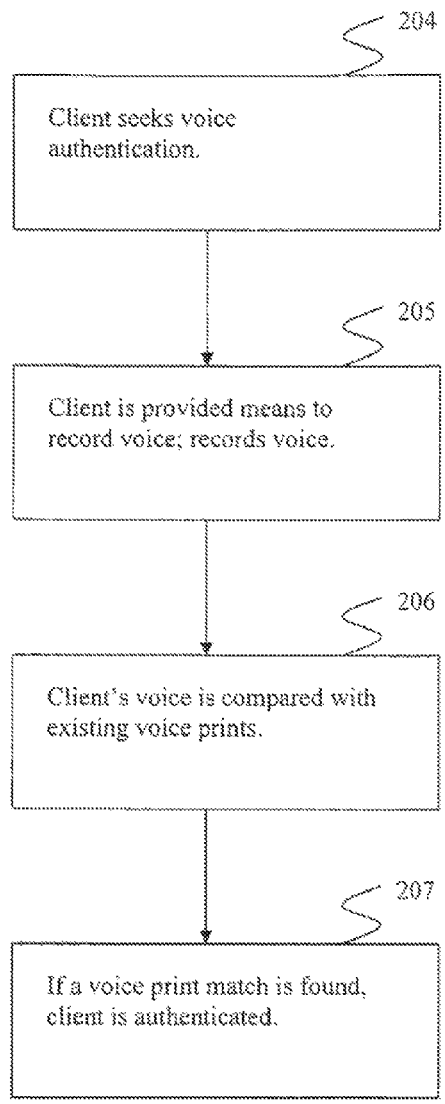
FIG. 2A
FIG. 2B

VOICE PRINT IDENTIFICATION PORTAL

RELATED APPLICATIONS

This application is a division of application Ser. No. 12/075,799 filed Mar. 13, 2008, which claims the benefit of U.S. Provisional Application No. 60/894,627 filed Mar. 13, 2007, which is hereby fully incorporated herein by reference.

FIELD OF THE INVENTION

The present invention relates generally to system access control based on user identification by biometric acquisition and speech signal processing for word recognition. More particularly, the present invention relates to combining voice based biometric identification for securing various computer related devices and speech recognition for device control and automated entry of information.

BACKGROUND

The field of processing voice signals for use within a computerized device has traditionally been split into two distinct fields, speaker identification, and speech recognition. These two fields have historically required separate and uniquely designed and configured systems. These systems are often provided by different vendors Speech recognition involves recognizing a human language word spoken by a speaker. In one example, speech recognition is utilized for computerized dictation, where a user speaks into a microphone and her words are recognized and entered into a document. Another example of speech recognition is controlling personal electronics, such as a cellular telephone or car stereo, through the use of verbal commands. Other applications for speech recognition include: command recognition, dictation, interactive voice response systems, automotive speech recognition, medical transcription, pronunciation teaching, automatic translation, and hands-free computing. Speech recognition is typically achieved through comparison characteristic qualities of spoken words, phrases, or sentences to one or more templates. A variety of algorithms are known in the art that allow qualification and/or comparison of speech to templates. These algorithms include: hidden Markov models, neural network-based systems, dynamic time warping based systems, frequency estimation, pattern matching algorithms, matrix representation, decision trees, and knowledge based systems. Some systems will employ a combination of these techniques to achieve higher accuracy rates.

Speaker identification involves the process of identifying or verifying the identity of a specific person based on unique qualities of human speech. Human speech is often referred to as a biometric identification mechanism similar to finger prints or retinal scans. Like fingerprints and retinal scans, every individual has a unique voice print that can be analyzed and matched against known voice prints. Like other biometric identification mechanisms, voice prints can be utilized for verification or identification.

Verification using a voice print is commonly referred to as voice authentication. Voice authentication is achieved in a similar manner to speech recognition: characteristic qualities of spoken words or phrases are compared to one or more templates. However, voice authentication is much more difficult to successfully achieve than speech recognition. First, speech recognition requires a less stringent match between the spoken word and a speech template. All that must be determined is what word was said, not who said that word based on a specific accent, pitch, and tone. Second, speaker identification requires matching the speaker to a much larger number of possibilities, because one person must be identified out of many, not just what word they spoke. Whereas it may be acceptable to take up to several seconds to perform voice authentication, speech recognition must be done at a relatively fast pace in order for an interface to be reasonably useable.

Traditionally, the use of speech for identification purposes versus speech for recognition purposes has been very segmented. While speech authentication requires complex and demanding comparisons, speech recognition requires real-time performance in order to meet user needs. Due to these differing requirements, existing systems (including computer hardware, software, or both) have been limited to performing one of these two functions.

The use of speech to authenticate a user has a variety of advantages over other identification methods. First, like fingerprints or iris scans, every human being has an entirely unique speech pattern that can be quantifiably recognized using existing technology. Second, unlike fingerprints or iris scans, the input to a speaker identification system (the spoken word) may be different every time, even where the speaker is saying the same word. Therefore, unlike other methods of human authentication, speech authentication provides the additional advantage of an ability to prevent multiple uses of the same voice print.

The rise of the computer age has drastically changed the manner in which people interact with each other in both business and personal settings. Along with the rise of the use of technology to conduct everyday life, security concerns with the use of computers have risen dramatically due to identity theft. Identity theft typically occurs where personal information such as bank accounts, social security numbers, passwords, identification numbers . . . etc., or corporate information is accessible when transferred over networks such as the internet, or when personal information or corporate information is entered into a user interface. For typical internet transactions such as consumer purchases, bank account transfers . . . etc, the transaction involves both a business side (back-end) and a customer side (front-end). The customer typically uses a computer, or handheld device such as a Smartphone or Personal Digital Assistant (PDA) to communicate during the transaction. Typically, communications during internet transactions are made very secure by using high security protocols such as Transport Layer Security (TSL) or Secure Socket Layer (SSL). However, when a customer enters in information (before it is transferred) at the front-end side of the transaction, the information is highly vulnerable to theft. In fact, in most cases of identity theft, personal information is stolen from the front-end side of the transaction. Therefore, a need exists to provide an efficient, more secure means of protecting the identity of one who wishes to interact in a secure environment over networks such as the internet. More specifically, a need exists to provide a secure transaction environment in which personal or corporate information is not communicated to the customer front-end in an accessible or repeatable format.

SUMMARY OF THE INVENTION

The invention described herein seeks to remedy the issues discussed above by providing a system and method of voice authentication. In one embodiment, a method of securely authenticating a client seeking access to secure information or services available through a network is disclosed herein.

In an embodiment, the method includes an enrollment process. The enrollment process may include receiving, at a server, an enrollment request, and a voice recording. The process further includes processing, at the server, the voice recording to determine identifying characteristics of the client's voice, and creating a voice print identification of the client and storing the voice print identification.

In an embodiment, the method also includes an authentication process. The authentication process includes receiving, at the server, a request for authentication of a client with an existing voice print. In one embodiment, the existing voice print was created according to the enrollment process discussed above. In one embodiment, the authentication process includes receiving a sample recording of the client's voice. In one embodiment, the process includes processing the sample recording. In one embodiment, the process includes comparing characteristics of the sample recording to at least one voice print identification. In one embodiment, the process includes determining, based at least in part on the comparing, that the client is authenticated. In one embodiment, the process includes communicating, over the network, an indication that the client is authenticated. In one embodiment, receiving, at the server, a sample recording of the client's voice is the only information received from the client that is used to determine that the client is authenticated.

In another embodiment, a method of securely authenticating a client seeking access to secure information available through a network is described here. In an embodiment, the method includes an enrollment process. In an embodiment, the enrollment process includes sending, to a server, an enrollment request. In an embodiment, the enrollment process includes the voice recording of a client. In an embodiment, the enrollment process includes sending, to a server, the voice recording. In an embodiment, the enrollment process includes receiving, from the server, an indication that a voice print for the client has been created and stored based on the voice recording.

In an embodiment, the method also includes an authentication process. In an embodiment, the authentication process includes sending, to the server, a request to authenticate the client. In an embodiment, the authentication process includes sending, to the server, a sample voice recording of the client. In an embodiment, the authentication process includes receiving, from the server, an indication that the client is authenticated. In an embodiment, the authentication process includes permitting the client access to secure information over the network based on the indication that the client is authenticated. In one embodiment sending, to the server, a sample voice recording of the client is the only information originating from the client that is used to authenticate the client.

In an embodiment, a system for securely authenticating a client seeking access to secure information available through a network is described herein. In an embodiment, the system includes a back-end computer system adapted to manage and control access to secure information. In an embodiment, the system includes a front-end interface, adapted to provide the client with access to the back-end computer system. In an embodiment, the system includes a voice analysis computer system, adapted to verify a client's identity based on a voice sample. In an embodiment, the front-end interface is adapted to provide the client with the ability to record a client voice sample and communicate the client's voice sample to the voice analysis computer system. In an embodiment, the voice analysis computer system is adapted to compare the received client's voice sample to at least one voice print and authenticate the client based at least in part on the comparison. In an embodiment, the voice analysis computer system is adapted to communicate an indication of authentication. In an embodiment, the sample voice recording of the client is the only information originating from the client that is used to authenticate the client.

In an embodiment, a method of operating a voice analysis system is described herein. In an embodiment, the method includes receiving, by a voice analysis system, at least one parameter indicating whether the system is to operate in a first mode or a second mode. In an embodiment, the method includes receiving, by the voice analysis system, a voice recording. In an embodiment, the method includes setting voice analysis constraints to a first level if the parameter indicates the first mode, or setting the voice analysis constraints to a second level if the parameter indicates the second mode. In an embodiment, the method includes comparing the voice recording to at least one template. In an embodiment, the comparison is based at least in part on the constraints. In an embodiment, the first mode indicates that the voice analysis system is to perform speaker identification. In an embodiment, the second mode indicates that the voice analysis system is to perform word recognition. In an embodiment, if the parameter indicates the first mode, an indication of authentication is provided. In an embodiment, if the parameter indicates the second mode, an indication of the textual value of the voice recording is provided.

BRIEF DESCRIPTION OF THE FIGURES

The invention may be more completely understood in consideration of the following detailed description of various embodiments of the invention in connection with the accompanying drawings, in which:

FIG. 2a and FIG. 2b illustrate generally a flow chart example of one embodiment of voiceprint authentication.

Figure 1:
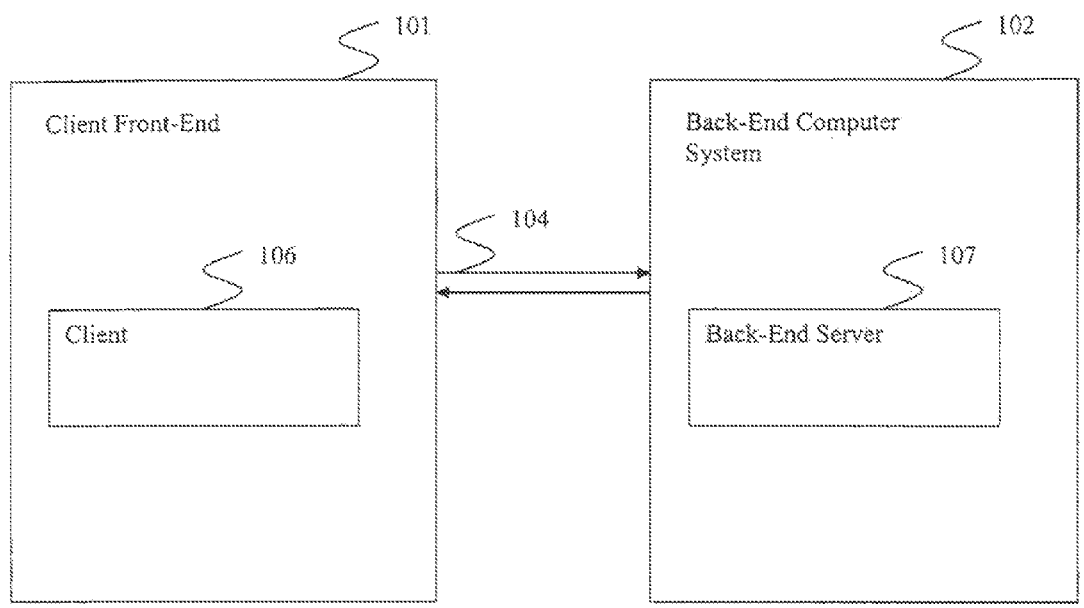
FIG. 1 illustrates generally a block diagram example of a typical transaction over a network.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 illustrates generally a block diagram example of a typical transaction over a network. According to the example of FIG. 1, client 106 seeks to communicate with a business over a network such as the internet. To communicate, client 106 uses a front-end interface 101. Front-end interface 101 may be any means with which a client may access content available over a network. A client may access a front-end interface 101 through any commonly known network access device such as, but not limited to, a computer, a Smartphone, or a PDA. Client 106, through front-end interface 101, communicates with back-end computer system 102. Back-end computer system 102 may include a back-end server 107.

According to the example illustrated in FIG. 1, front-end interface 101 communicates with back-end computer system 102 through connection 104. A typical transaction usually includes authentication of client 106 by back-end computer system 102. Often, authentication is achieved through client 106 supplying some form of identification to back-end computer system 102. Some examples of identification are pin numbers and associated passwords. Other examples include personal information such as social security numbers, addresses, telephone numbers, or client's 106 mother's maiden name. Due to the need for personal devices discussed above to be able to connect with a large variety of sources, connection 104 between front-end interface 101 and back-end computer system 102 is typically a less than secure connection. As a result of an insecure connection, the personal information transferred over connection 104 is vulnerable to theft.

FIG. 2a and FIG. 2b illustrate generally a flow chart example of one embodiment of voiceprint authentication according to the subject matter disclosed herein. FIG. 2a illustrates generally one embodiment of an account initialization process. At 201, a client initiates an account with a provider of voiceprint authentication services (service provider). At 202, the client is provided a means to record his/her voice and instructions for using those means. The client's voice may be recorded by any means known in the art, and in any format known in the art such as mp3 format, way format, or a proprietary audio format. In various embodiments, it is to be understood that any digital audio format (e.g. way, mp3 formats) is within the scope of the subject matter discussed herein. In an alternative embodiment, to ensure greater security, a proprietary audio format is used to record the client's voice. The recording is then transferred to the service provider. At 203, the service provider analyzes the client's recording and extracts characteristics of the client's voice to create a voiceprint that represents the client's identity. At 208, the voiceprint is stored by the services provider for later use in authenticating the client.

FIG. 2b illustrates generally a voiceprint authentication process according to the subject matter disclosed herein. It is assumed in this embodiment that prior to attempting voiceprint authentication of a client the client has gone through an account initialization process, such as the process discussed in FIG. 2a. At 204, the client seeks voice authentication. The client may seek voice authentication for a number of reasons, including: internet website or telephone access to a bank or other commercial service provider, or in person authentication in a direct buyer/seller transaction. At 205, the client is provided a means to record his/her voice. The client may be provided instructions to use a particular word or phrase, or the client may be allowed to speak any word or phrase for use in authenticating his identity. A recording of the client's voice is created. At 206, the service provider compares the recording of the client's voice made at step 205 to stored voiceprints. In one embodiment, the service provider has access to only the client's voice recording, and that recording is compared to all the voiceprints the service provider has access to until a match is found. In another embodiment, the client's voice recording is provided to the service provider along with a client identification number. This embodiment is advantageous in that the service provider need only make a single comparison, thus decreasing the time and resources needed to authenticate a client. At 207, if a match is found by the service provider, the client is authenticated.

Figure 3:
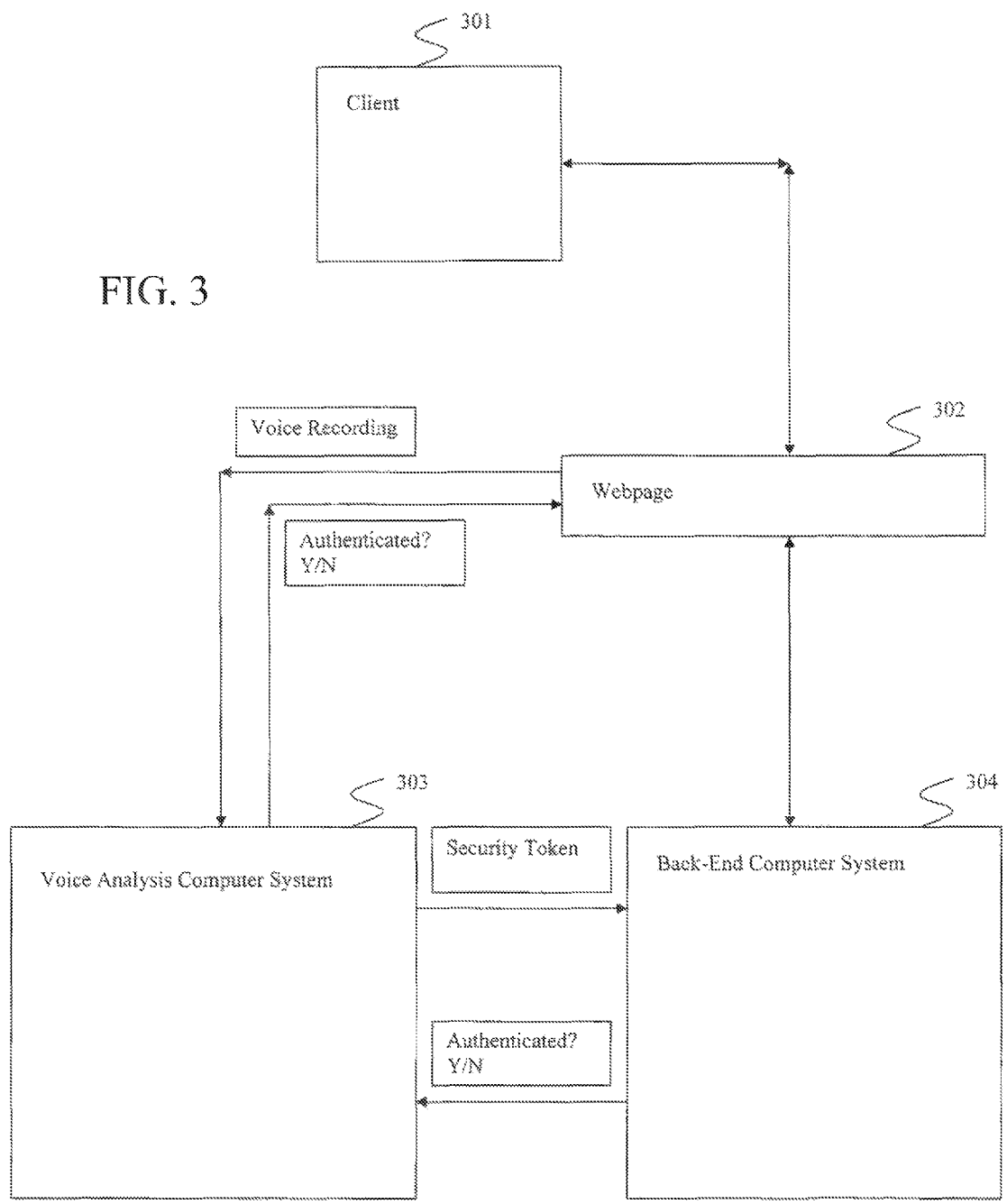
FIG. 3 illustrates generally an embodiment of the use of voice authentication for a client-business transaction over a network.

FIG. 3 illustrates generally one embodiment of the use of voice authentication system for a secure access transaction over a network according to the subject matter disclosed herein. In one embodiment, client 301 seeks access to secure information or services. In order to do so, client 301 uses front-end interface 101 to access webpage 302 that is available over a network such as the internet. Webpage 302 is controlled by back-end computer system 304. In typical transactions such as described herein, client 301 is required to enter personal information such as an account number and/or password into webpage 302. As discussed with respect to FIG. 2, the connection between front-end interface 101 and webpage 302 may be a non-secure connection. Therefore the opportunity for identity theft is present.

According to the embodiment illustrated in FIG. 3, instead of password and username, a voiceprint is used to authenticate the client and allow him/her access to secure content on back-end computer system 304. It is assumed for purposes of this discussion that client 301 has previously initiated an account with the voice authentication service provider (service provider) as discussed in FIG. 2.

When client 301 visits webpage 302, the client is offered the ability to, or required to, use voice authentication to access secure information. In various embodiments, client 301 is provided with means to create a sample voice recording. In various embodiments, the client is provided an interface through the webpage to record his/her voice. The recording (and possibly a user id associated with the service provider as discussed in reference to FIG. 2) is communicated to voice analysis computer system 303. Voice analysis computer system 303 then compares the received recording to one or more stored voiceprints, and if a match is found, the client's identity is verified.

In one embodiment, voice analysis computer system 303 communicates, using a secure connection, with back-end computer system 304 to determine whether the particular client 301 has permission to access particular content. In one embodiment, voice analysis computer system 303 has access to a client security key (and possibly security keys allowing access to back-end computer system 304 itself) that allows access to back-end computer system 304. According to this embodiment, voice analysis computer system 303 transmits the client security key to back-end computer system 304. In response, back-end computer system 304 may determine whether client 301 should be granted access, and communicates (using a secure connection) authorization of access to voice analysis computer system 303. Voice analysis computer system 303 may then allow access to secure content through webpage 302.

In another embodiment, voice analysis computer system 303 does not have access to a client security key to determine permission. Instead, voice analysis computer system 303 attempts to verify the identity of client 301, and, if successful, communicates success to back-end computer system 304. According to this embodiment, back-end computer system 304 determines whether client 301 is to be granted permission to access webpage 302, and back-end computer system 304 itself communicates and allows access to webpage 302.

In another embodiment, voice analysis computer system 303 verifies permission by reviewing client and business specific information stored on voice analysis computer system 303. According to this embodiment, voice analysis computer system 303 does not communicate security keys to back-end computer system 304 and receive authorization from back-end computer system 304. Instead, the entire authentication process is achieved in voice analysis computer system 303. When a client's identity and permission are verified, authorized access is communicated to webpage 302.

The various embodiments of client authentication illustrated in FIG. 3 provide far greater security than previously known systems of client authentication. Because only the client's voice recording, and possibly service provider username, are entered into and/or communicated over accessible networks, it is nearly impossible for anyone to get access to the client's personal information. Identity verification through voice authentication provides a significant advantage in that it is nearly impossible to replicate a person's voice.

In various other embodiments, client authentication illustrated in FIG. 3 may be used to authenticate access to content, information, or devices other than webpage 302. Examples of such devices include cellular phones, computers, laptops, or a Personal Digital Assistant (PDA). In one such embodiment, client seeks access to a secure device through voice authentication. According to this embodiment, there may or may not be a back-end computer system 304 that controls the device. In one embodiment, where back-end computer system 304 does exist, the system functions identically to the above descriptions, however instead of webpage 302 access, device access is controlled. In another embodiment, where no back-end computer system 304 exists, the device is communicatively coupled to voice analysis computer system 303 through a network. According to this embodiment, client 303 is provided means to create a sample voice recording. The voice recording is communicated to voice analysis computer system 303, and the client's 301 voice may or may not be authenticated. Voice analysis computer system 303 may have access to unlock, or otherwise provide access to, the device. If authentication is verified, voice analysis computer system 303 communicates with the device and allows client 301 access to the device.

Figure 4:
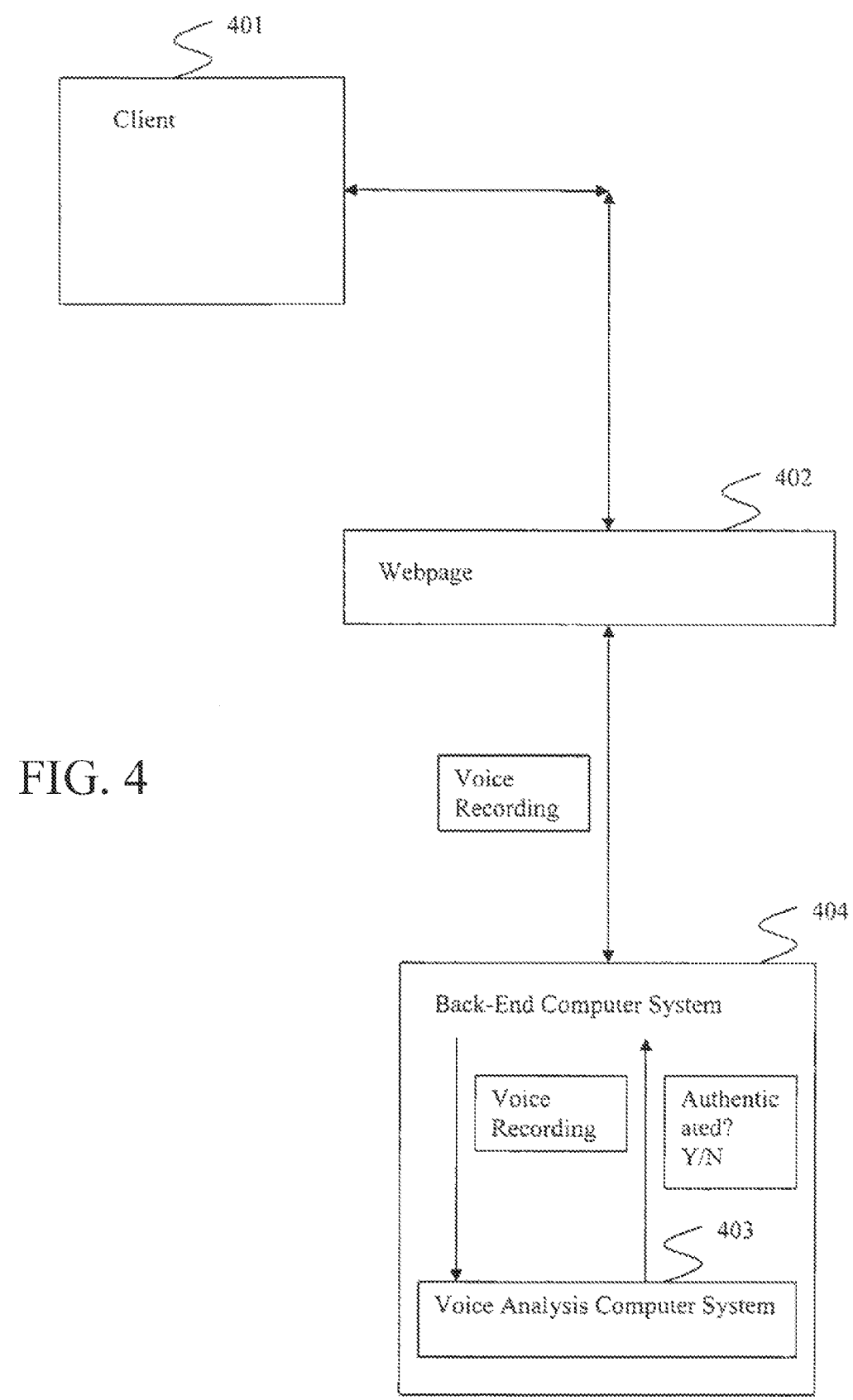
FIG. 4 illustrates generally an alternative embodiment of the use of a voice authentication system.

FIG. 4 illustrates generally an alternative embodiment of a voice authentication system to manage client-business transactions over a network according to the subject matter disclosed herein. The embodiment illustrated in FIG. 4 is nearly identical with the embodiment illustrated in FIG. 3, except voice analysis computer system 403 is embedded within back-end computer system 404.

Figure 5:
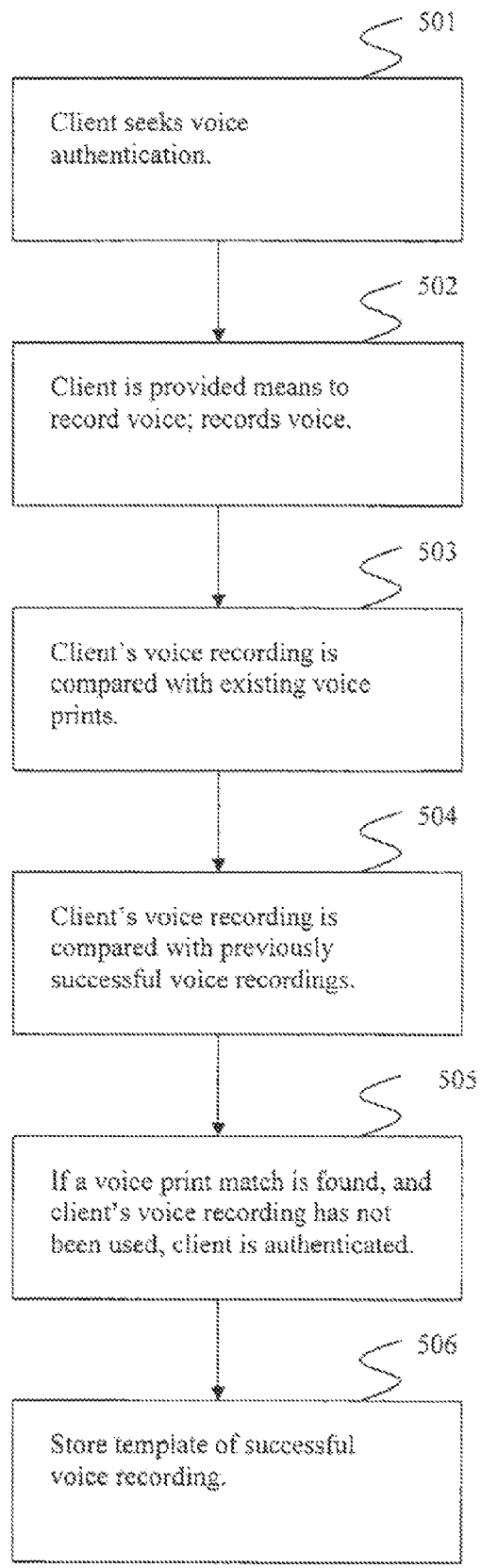
FIG. 5 illustrates generally one embodiment of an additional security feature.

FIG. 5 illustrates generally one embodiment of an additional security feature according to the subject matter disclosed herein. The embodiment illustrated in FIG. 5 is nearly identical to FIG. 2b, except additional security steps are added to the process of voiceprint authentication. Similar to FIG. 2b, at 501 a client seeks voice authentication to procure secured access. At 502, the client is provided a means to record his/her voice, and a recording of the client's voice is created. At 503, the service provider compares the recording of the client's voice made at step 502 to stored voiceprints. At 504, the voice recording is compared with one or more existing voiceprints to determine if a match exists. Instead of authentication based primarily on the client's stored voiceprint alone, the embodiment illustrated in FIG. 5 includes the additional step of, at 505, comparing the client's voice recording not only to the client's voiceprint, but also to one or more templates of recordings of the client's voice that were previously successful in the authentication process. This additional step ensures against fraudulent behavior in that it prevents someone from using a recording of a person's voice in order to access personal information. At 505, if a voiceprint match is found, and the voice recording has been determined not to have been used previously, the client is authenticated. At 506, the client's voice recording is stored for later comparison.

Figure 6:
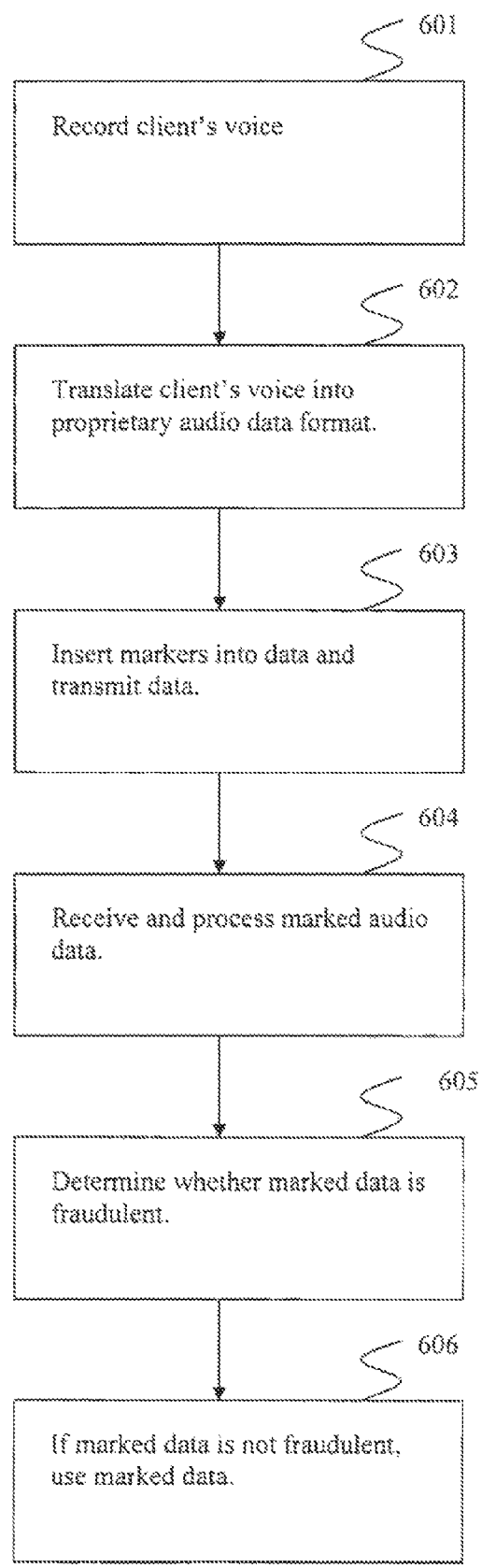
FIG. 6 illustrates generally one embodiment of an additional security feature.

FIG. 6 illustrates generally a flow chart of one embodiment of an additional security feature according to the subject matter presented herein. As previously discussed, audio data may be recorded and/or transmitted by any means known in the art, or by a proprietary format. In one embodiment, where a proprietary format is used, the audio data is further marked in order to provide additional security. Marking includes inserting, in the audio data, one or more indicators. These indicators are readable by systems adapted to utilize the proprietary data format. These indicators provide such systems with the ability to determine whether the audio data has been used previously, and whether the audio data has been used fraudulently. Therefore, the embodiment discussed above provides an additional layer of security to prevent the fraudulent use of audio data to access personal information. Turning now to FIG. 6, at 601, a client's voice is recorded. At 602, the client's voice is recorded in a proprietary audio format, or translated to a proprietary audio format, and an audio file is created. At 603, markers are inserted into the audio file and the audio file is transmitted. At 604, the audio data is received and processed. At 605, the audio file and included markers are processed to determine if the audio file is the one sent, and whether or not the audio file has been determined fraudulent. At 606, if the audio file is determined to be non-fraudulent, the audio file is used for purposes described herein.

Figure 7:
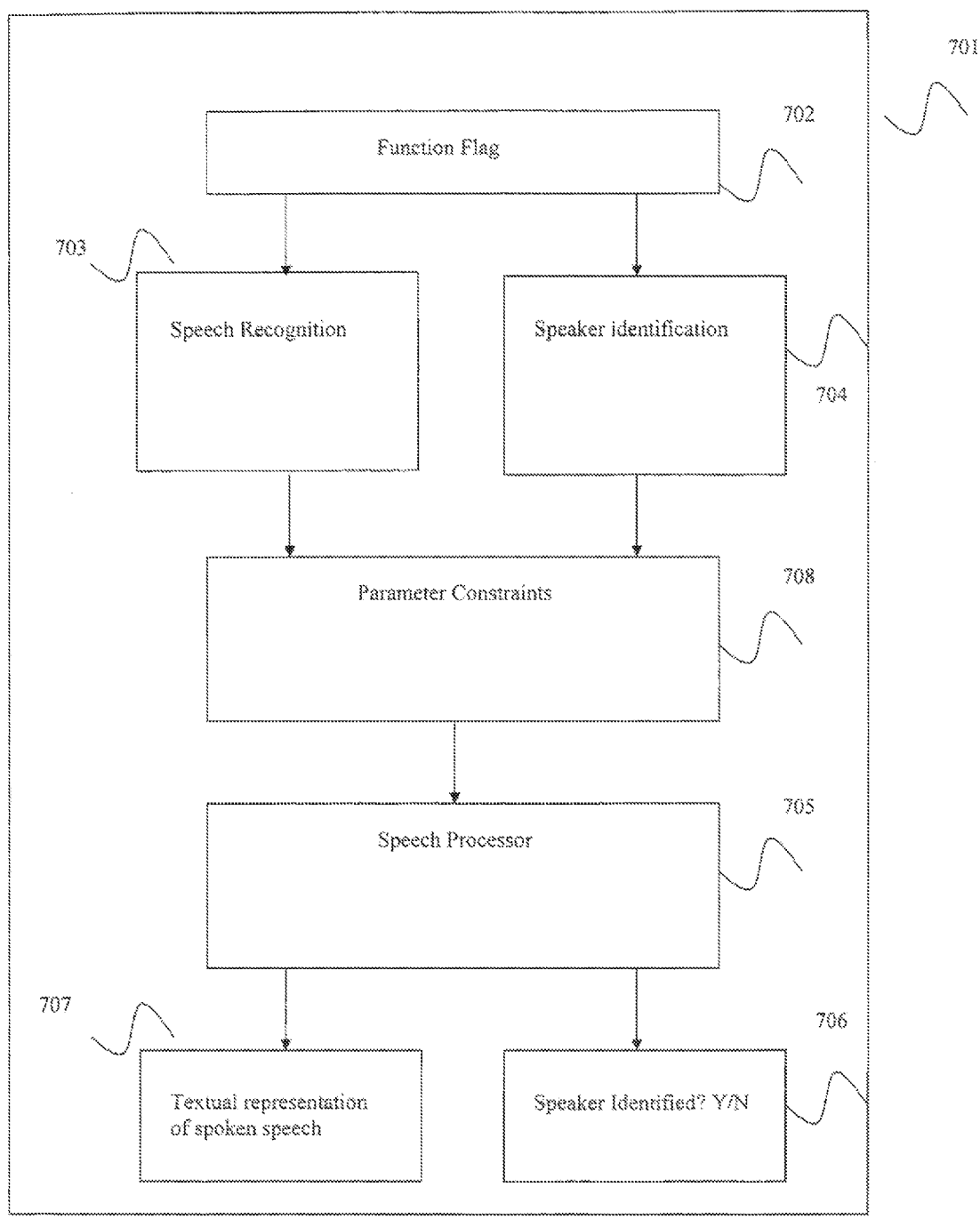
FIG. 7 illustrates generally one embodiment of a voice analysis system adapted to support both speech recognition and speaker identification.

FIG. 7 illustrates generally one embodiment of a speech analysis engine 701 adapted to support both speaker identification and speech recognition. According to this embodiment, dual purpose speech analysis engine 701 is adapted to accept as input a flag 702 designating the desired function of engine 701. Flag 702 indicates to engine 701 whether speech recognition 703 or speaker identification 704 is desired. Parameter constraints 705 define the strictness with which speech processor 708 determines a match according to speech characteristics. If speaker identification 704 is required, parameter constraints 705 are set with strict requirements that must be met to find a positive match with a speaker's characteristics. In contrast, if speech recognition 703 is desired, then parameter constraints 705 are set with much lower requirements that a positive match with the characteristics of a particular spoken word is found. Where speaker identification is desired, engine 701 is adapted to return to the voice analysis computer system 303 a positive or negative indication of whether the speaker was identified 706. At 707, if speech recognition is desired, engine 701 is adapted to return a textual representation of spoken speech 707.

Figure 8:
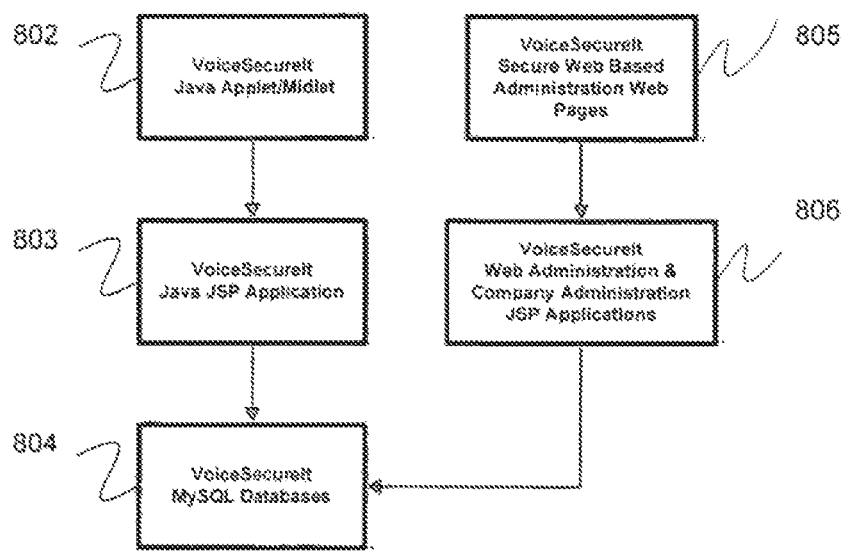
FIG. 8 illustrates generally a block diagram of one embodiment of an implementation of the system described herein.

FIG. 8 illustrates generally a block diagram of one embodiment of the implementation of a voice analysis system 801 as disclosed herein. According to various embodiments, voice analysis system 801 is implemented such that the system is capable of downloading and executing application software to front-end interface 101. Such capabilities are advantageous to implementation of system 801 because they allow access and control of front-end interface 101. For example, system 801 may be capable of exercising control over microphone capabilities of front-end interface 101. In one embodiment, system 801 is implemented using a Java Virtual Machine environment. According to this embodiment, system 101 includes Java Applet 802. Applet 802 is a program with the ability to download and execute software on front-end interface 101. Applet 802 controls much of the user interface requirements of system 801, such as microphone functionality.

System 801 may further include Java JSP application 803. Java JSP application 803 is adapted to run on voice analysis computer system 303. JSP application is further adapted to communicate with applet 802 to receive and transfer commands and information from applet 802. In one embodiment, JSP application 803 is adapted to receive a voice recording from applet 802, and process that voice recording. System 801 may further include one or more databases such as MySQL Database(s) 804. JSP application 803, among other applications, may be adapted to store and manage data in Databases 804.

In some embodiments, system 801 also includes Secure Web Based Administration Pages 805. In various embodiments, administration pages 805 provide an interface to create, modify, and configure client users.

In some embodiments, system 801 further includes Web Administration and Company administration JSP applications 806. In various embodiments, Web Administration and Company Administration JSP applications 806 provide a web-based interface to configure companies, including companies access to system 801.

In one embodiment, applet 802 is adapted to run on front-end interface 101, while JSP application 803 is adapted to run on voice analysis computer system 303. In an alternative embodiment, both applet 802 and JSP application 803 are adapted to run on front-end interface 101. In yet another alternative embodiment, JSP application 803 is adapted to run on back-end computer system 304.

Figure 9:
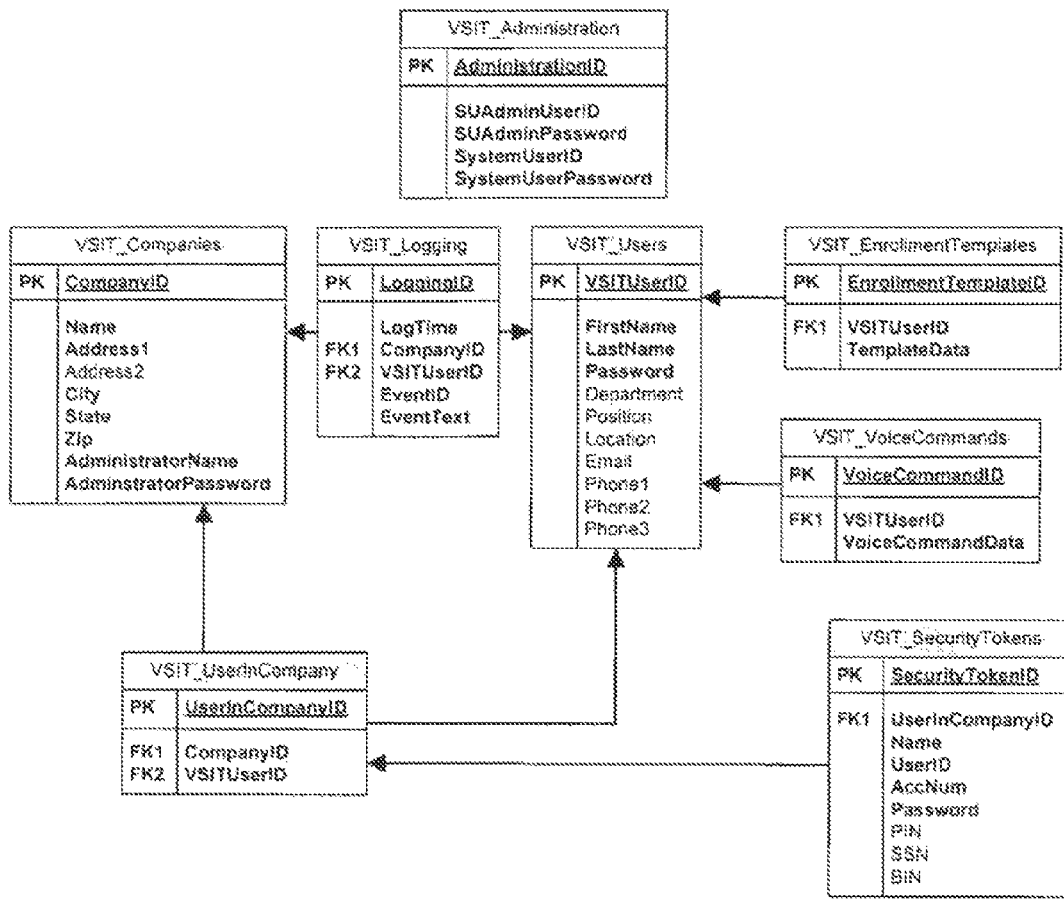
FIG. 9 illustrates generally one example of potential data stored by MySQL databases according to the subject matter described herein.

FIG. 9 illustrates generally one example of potential data stored in MySQL Database(s) 804. Detailed database schema SQL script source code is included as an appendix to this application.

Figure 10:
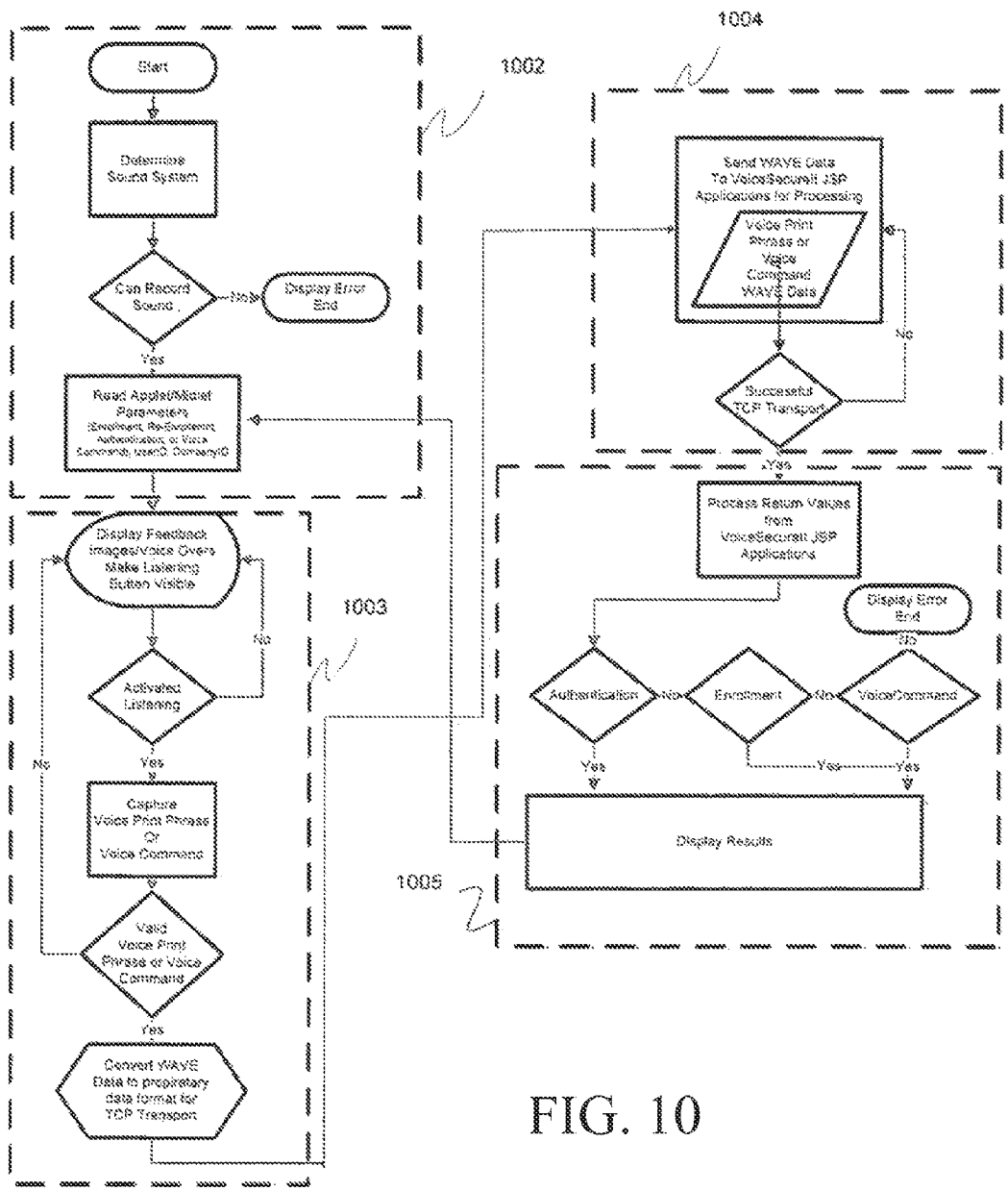
FIG. 10 illustrates generally a flowchart example of an applet according to the subject matter described herein.

FIG. 10 illustrates generally a flow chart diagram of one embodiment of an applet 802 according to the subject matter disclosed herein. In one embodiment, applet 802 is a Java Applet. In an alternative embodiment, applet 802 is implemented as a Java Midlet instead of a Java Applet. A Java Midlet is preferred when front-end interface 101 is a portable device or an embedded device. The term applet as used herein is intended to refer to either a Java Applet or a Java Midlet. Applet 802 may be adapted to run on front-end interface 101. At 1002, applet 802 is adapted to initialize on front-end interface 101. Initializing may include determining the available sound recording/management hardware and software available to the front-end interface 101. Initializing may further include receiving input parameters that define what actions Applet 802 is to take. Input parameters may include: 1) whether enrollment, re-enrollment, authentication, or speech recognition capabilities are desired of applet 802, and 2) identification information such as a user or company identification indicator. Initializing may further include providing a graphical user interface to a user such that the user may select input parameters for applet 802.

At 1003, applet 802 is adapted to capture a client's voice. Voice capture may include: 1) providing a user interface to allow the client to record voice, 2) providing instructions to the client, 3) controlling front-end interface 101 in order to record voice (including measuring background noise and setting detection thresholds), 4) verifying that the resultant recording meets requirements for further processing, and 5) preparing the recording for communication.

In one embodiment, the voice recording is communicated using a TCP protocol. At 1004, after the user's voice is recorded, applet 802 sends the voice recording to JSP application 803 for processing, and verifies that the communication was successful. In one embodiment, applet 802 sends the voice recording over a secure connection such as an SSL connection. In one embodiment, JSP application 803 runs on voice analysis computer system 303.

At 1005, when JSP application 803 has completed processing the voice recording, applet 802 processes return values from JSP application 803. Applet 802 processes the return values based on what function was desired at 1002. Also at 1005, applet 802 provides the user with a results display. In one embodiment, if authentication or enrollment were requested, applet 802 provides the user with an indication that authentication was successful or unsuccessful. In another embodiment, where speech recognition was requested, applet 802 provides the user with a textual indication of the words that were spoken. In a similar embodiment, applet 802 provides the client with a verbal indication of words spoken by the client, or applet 802 may also act in response to words spoken by the client. Once the results have been provided to the user, applet 802 returns to 1002 and allows the client to re-enter parameters.

Figure 11:
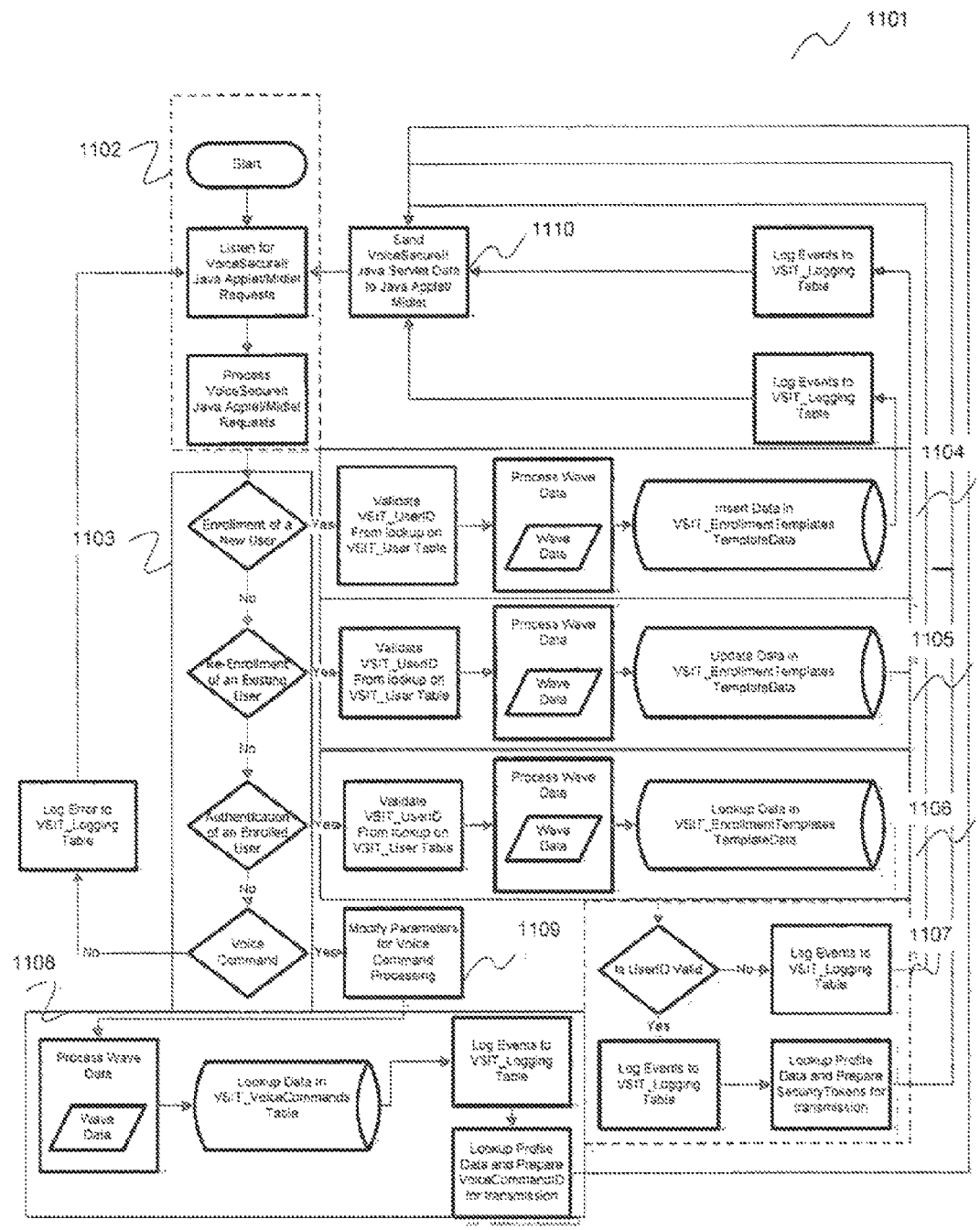
FIG. 11 illustrates generally a flowchart example of a JSP application according to the subject matter described herein.

FIG. 11 illustrates generally a flow chart diagram of one embodiment of a Java JSP application 803 according to the subject matter disclosed herein. In one embodiment, Java JSP application 803 is implemented as a Java Servlet. In another preferred embodiment, JSP application 803 is run on voice analysis computer system 303.

At 1102, JSP application 803 awaits a request from applet 802. When a request is received, JSP application processes the request. At 1103, JSP application 803, based on the request from applet 802, determines what function is desired of JSP application 803. JSP application 803 determines whether applet 802 requested: enrollment of a new user, re-enrollment of an existing user, authentication of an enrolled user, or speech recognition.

At 1104, and 1105, where enrollment of a new user or re-enrollment of an existing user is requested by applet 802, JSP application validates the user ID of the user, processes the voice recording, and updates an enrollment template and stores the template in databases 804. At 1110, data is transferred back to applet 803.

At 1106 and 1107, where authentication of an existing user is requested by applet 802, the user's user id is validated, the user's voice recording is processed, and the voice recording is compared to existing voice templates to determine whether the client is authenticated. If the client is authenticated, security tokens are prepared for transmission to applet 802. At 1110, security tokens and other data are communicated to applet 802.

At 1109, where speech recognition is requested, JSP application 803 is adapted to modify (lessen) voice recognition constraints such that JSP application 803 is only adapted to verify a particular word, not a particular client's voice. At 1108, the voice recording is processed and compared to stored voice commands. If a match is found, an identification of a voice command is prepared for communication to applet 802. At 1110, the identification of a voice command and other data are communicated to applet 802.

Figure 12:
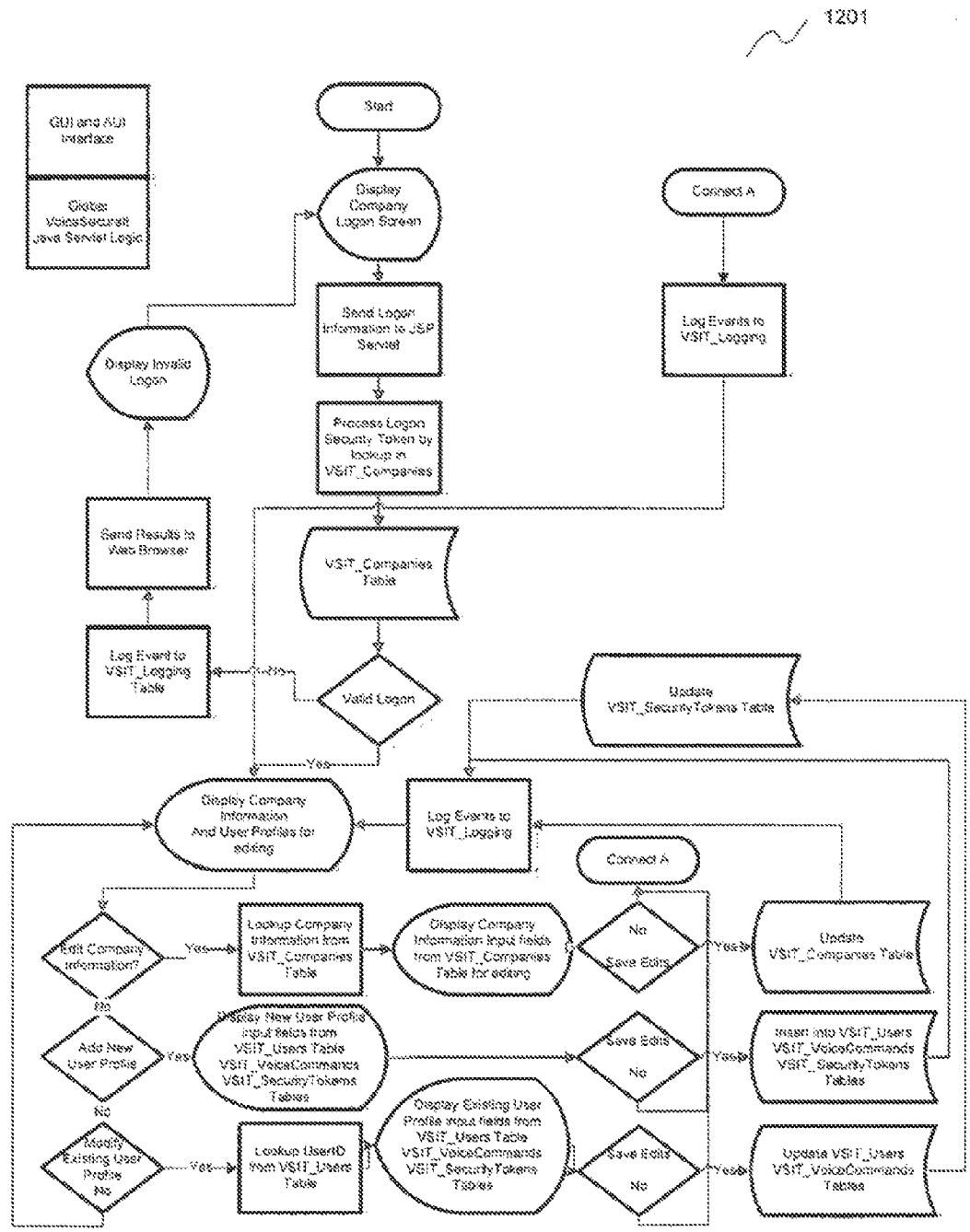
FIG. 12 illustrates generally a flowchart example of a company administration JSP application according to the subject matter described herein.

FIG. 12 illustrates generally one embodiment of a Company Administration JSP Application 1201 as disclosed herein. Company Administration JSP Application 1201, provides an interface to create, modify, and configure client user data. The client user data consist of the following; UserID, CompanyName, FirstName, LastName, Password, Department, Position, Location, Email, Phone1, Phone2, Phone3, SecurityTokenID's, EnrollmentTemplateID's, and VoiceCommandID's.

Figure 13:
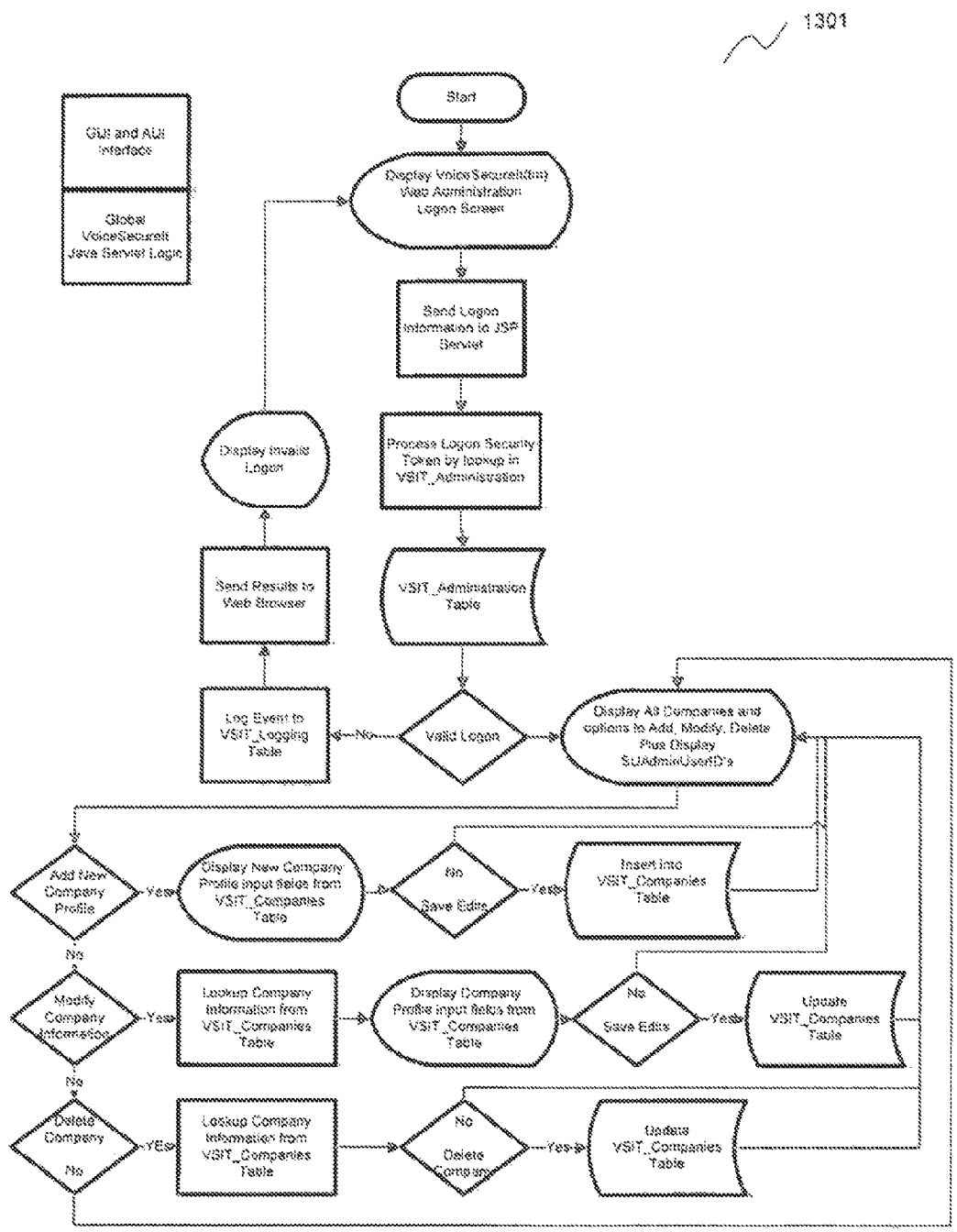
FIG. 13 illustrates generally a flowchart example of a web administration JSP application according to the subject matter described herein.

FIG. 13 illustrates generally one embodiment of a Web Administration JSP Application 1301. Web Administration JSP Application 1301 provides a web-based interface to configure companies, and their access to the Voice Print Portal Solution.

In various embodiments, alternatives are provided for a client who does not have access to a front-end interface 101 that is capable of recording voice. In one embodiment, a client is provided the ability to select a "Call In" button. When the "Call In" button has been selected, the client is provided an ordinary telephone number. The user may call the number in order to record his/her voice.

In another embodiment, the client does not have any access to a front-end interface 101 or the internet. According to this embodiment, a client is provided with the ability to operate the entire system through ordinary telephone service. The client may communicate with and request system 801 functions through voice commands or though dialing numbers on a telephone keypad. In one embodiment, this telephone only system is implemented using telephony systems such as IPPC or IPPC express offered by Cisco Systems, Inc.

Finally, while the present invention has been described with reference to certain embodiments, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method of operating a voice analysis system, comprising:

using a front end interface on a computer system that includes a microphone to initialize a voice analysis system for a user by inputting at least a first voice recording of the user via the microphone to be communicated Over a network connection to a voice analysis computer system that analyzes and stores a template voiceprint for authentication of the user;

using the front end interface to input a second voice recording of the user via the microphone and at least one parameter indicating whether the voice analysis computer system is to operate in a first speaker identification mode or a second word recognition mode to be communicated over the network connection to the voice analysis computer system;

using the voice analysis computer system to analyze the second voice recording, setting voice analysis constraints to a first level if the parameter indicates the first speaker identification mode, or setting the voice analysis constraints to a word recognition second level if the parameter indicates the second mode;

comparing the second voice recording to the template voiceprint, wherein the comparison is based at least in part on the constraints if the parameter indicates the first speaker identification mode, communicating over the communication network an indication of authentication of the user to at least one of the front end interface to authenticate the user on the computer system or a back end computer system to authenticate access to the back end computer system if the second voice recording provides a positive match with a voice characteristic of the voice template based on a stricter match requirement; and if the parameter indicates the second word recognition mode, communicating over the communication network to the front end interface a textual representation of the second voice recording if there is a positive match of words represented in the second voice recording based on a lower match requirement, wherein using the voice analysis computer system is used to analyze a plurality of second voice recordings and further comprises:

storing a representation of each second voice recording as part of the template voiceprint for the user;

if the parameter indicates the speaker identification first mode, then after there is the positive match and before communicating the indication of authentication of the user, using the voice analysis system to compare the second voice recording with each of the representations of each second voice recording stored as part of the template voiceprint for the user associated with the positive match to determine that the second voice recording has not been used previously for authentication of the user and communicating the indication of authentication of the user only if the second voice recording has not been used previously for authentication of the user.

2. A method of operating a voice analysis system computer system having a memory, a processor and a network connection, comprising:

receiving over the network connection a first voice recording of a user input from a front end interface on a computer system that includes a microphone;

initializing a voice analysis system to authenticate the user by analyzing the first voice recording to create a template voiceprint for authentication associated with the user that includes at least one voice characteristic attributed to the user;

storing the template voiceprint in the memory;

receiving over the network connection a second voice recording of the user input from a front end interface on a computer system that includes a microphone and at least one parameter indicating whether the voice analysis computer system is to operate in a first authentication mode or a second recognition mode;

configuring the voice analysis system in the first authentication mode by setting voice analysis constraints that control the operation of the voice analysis system to a first level, or setting the voice analysis constraints to a second level;

using the voice analysis system to create a representation of the second voice recording, if the voice analysis system is configured for operation in the first authentication mode, using the voice analysis system to perform a comparison, of the representation of the second voice recording with template voiceprints stored in the memory based at least in part on a stricter match requirement of the voice analysis constraints to determine whether there is a template voiceprint with a positive match and, in response, communicating over the communication network an indication of authentication of the user associated with the template voiceprint with the positive match to at least one of the front end interface from which the second voice recording is received to authenticate the user or to a back end computer system to authenticate access to the back end computer system; and if the voice analysis system is configured for operation in the second recognition mode, using the voice analysis system to perform a comparison of the representation of the second voice recording with template voiceprints stored in the memory based at least in part on a lower match requirement of the voice analysis constraints to determine whether there is a template voiceprint with a positive match and, in response, using at least one of the voice characteristics of the template voiceprint, with the positive match to perform word recognition of the second voice recording and communicating over the communication network to the front end interface from which the second voice record ng is received a textual representation of the word recognition of the second voice recording, wherein operating the voice analysis computer system is used to analyze a plurality of second voice recordings and further comprises:

storing each of the voiceprints created based on a second voice recording as part of the template voiceprint for the user associated with the positive match for that voiceprint;

if the parameter indicates the first authentication mode, then after there is the positive match and before communicating the indication of authentication of the user associated with the positive match, using the voice analysis system to further perform a comparison of the voiceprint for the second voice recording with each of the voiceprints created stored as part of the template voiceprints for the user associated with the positive match to determine that the second voice recording has not been used previously for authentication of the user and communicating the indication of authentication of the user only if the second voice recording has not been used previously for identification of the user.

3. A method of operating a voice analysis system having at least a memory, a processor and a network connection with at least one input computer system configured for user input that includes a microphone, comprising:

receiving over the network connection a first voice recording from an input computer system of one or more words spoken by a user;

enrolling, the user in the voice analysis system by analyzing the first voice recording to create and store in the memory a template voiceprint for authentication of the user that includes at least one voice characteristic attributed to the user;

receiving over the network connection a second voice recording from an input computer system and at least one parameter indicating whether the voice analysis computer system is to operate in a first authentication mode or a second recognition mode;

if the voice analysis system is configured for operation in the first authentication mode, using the voice analysis system to compare a representation of the second voice recording with template voiceprints stored in the memory based at least in part on a stricter match requirement of voice analysis constraints of the at least one voice characteristic to determine whether there is a template voiceprint with a positive match and, if so, then:

storing the representation of the second voice recording as part of the template voiceprint for the user associated with the positive match;

comparing the representation of the second voice recording with each part of the template voiceprints for the user associated with the positive match to determine that the second voice recording has not been used previously for authentication of the user; and communicating over the communication network an indication of authentication of the user associated with the template voiceprint with the positive match only if the second voice recording has not been used previously for authentication of the user; and if the voice analysis system is configured for operation in the second recognition mode, using the voice analysis system to compare a representation of the second voice recording with template voiceprints stored in the memory based at least in part on a lower match requirement of the voice analysis constraints of the at least one voice characteristic to determine whether there is a template voiceprint with a positive match, and, if so, then:

performing a word recognition of the second voice recording using in part the at least one voice characteristic; and communicating over the communication network a textual representation of the word recognition of the second voice recording.

4. The method of claim 3 wherein the step of communicating over the communication networks in the first authentication mode includes sending the indication to at least one of the input computer system or a back end computer system.

5. The method of claim 3 wherein the step of communicating over the communication networks in the second recognition mode includes sending the textual representation to at least one of the input computer system or a back end computer system.

* * * * *

UNITED STATES PATENT AND TRADEMARK OFFICE
CERTIFICATE OF CORRECTION

PATENT NO. : 9,799,338 B2
APPLICATION NO. : 14/263572
DATED : October 24, 2017
INVENTOR(S) : Grover Page 1 of 1

It is certified that error appears in the above-identified patent and that said Letters Patent is hereby corrected as shown below:

In the Claims

Column 11, Line 60, Claim 1 please delete "Over" and insert in its place --over--.

Column 13, Line 33, Claim 2 please delete "record ng" and insert in its place --recording--.

Signed and Sealed this
Twenty-fourth Day of April, 2018

Andrei Iancu
*Director of the United States Patent and Trademark Office*